United States Statutory Invention Registration [19]

[11] Reg. Number: H613

Stello et al.

[43] Published: Apr. 4, 1989

[54] PORTABLE SHIPBOARD GUNNERY TRAINING/DIAGNOSTIC APPARATUS

[75] Inventors: Samuel L. Stello; James M. Johnson; J. Harold Jones, all of Fredericksburg, Va.

[73] Assignee: The United States of America as represented by the Secretary of the Navy, Washington, D.C.

[21] Appl. No.: 629,290

[22] Filed: Jul. 9, 1984

[51] Int. Cl.[4] ..... F41G 3/26

[52] U.S. Cl. ..... 434/19; 89/41.17; 89/41.19; 235/411; 235/414; 434/1; 434/27

[58] Field of Search ..... 434/1, 17, 19, 27; 235/404, 411, 413, 414; 73/167; 89/41.01, 41.14, 41.17, 41.19; 364/131

[56] References Cited

U.S. PATENT DOCUMENTS 3,997,762 12/1976 Ritchie et al. ..... 89/41.19
4,424,559 1/1984 Lorincz et al. ..... 364/131
4,483,190 11/1984 Cornett ..... 73/167

OTHER PUBLICATIONS

Brown, David A., "In-Flight Simulator Capabilities Tested", Aviation Week & Space Technology, 8/9/71.

*Primary Examiner*—Harold J. Tudor
*Attorney, Agent, or Firm*—Robert F. Beers; Kenneth E. Walden; John G. Wynn

[57] ABSTRACT

A rugged portable diagnostic apparatus is configured for temporary installation and operation on board Naval ships. The apparatus provides gunnery training support by allowing a comprehensive empirical assessment and feedback of individual, team and equipment performance on an economical and environmentally responsible basis.

10 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PORTABLE SHIPBOARD GUNNERY TRAINING/DIAGNOSTIC APPARATUS

BACKGROUND OF THE INVENTION

1. Field of the Invention

The present invention relates to weaponry training apparatus, but more particularly, the present invention relates to a gunnery training/diagnostic apparatus suitable for use aboard ship under simulated or actual firing conditions.

2. Description of the Prior Art

In the prior art, a need has been established to configure a portable, shipboard training/diagnostic apparatus so as to identify and correct operator or equipment related deficiencies prior to, and during, live ordnance firings on naval gun fire support (NGFS) ranges. The apparatus should permit hands-on operator training and equipment diagnostics on the ship's "machinery", i.e., fire control computer, gun fire control system, etc. This will result in fewer on-range abortions and reduced fuel useage, and create an effective training capability that will depend less on conditions, personnel and training regulations at the NGFS ranges.

Traditionally, the Navy has always had a problem in training for gunnery exercises. In the past, when at the NGFS ranges, there was no feedback mechanism to let the gunnery or training officer know what was wrong when targets were not hit. Typically, the gunnery personnel would go to the range aboard ship and just fire, and if the projectiles were on target then the gunnery exercise would be considered a success. However, if the projectiles were off target there was no way of ascertaining why they were off target, i.e., no "positive feedback".

A typical ship has a lot of "machinery" in the form of computers, navigational equipment and gun mounts that can malfunction. Also, there are spotters at the range whose primary job is to relay information back to the gunnery officer onboard ship relating to the projectiles being fired. There is a "safety zone" around the target, and if the projectiles are not within this safety zone, the range officer will generally require the exercise to cease. Now if the projectiles are within the safety zone, the training personnel can sit there all day and shoot at the targets without hitting them.

Even if the spotters tell a gunnery officer whether they are long or short of the target, this information is only useful if the patterns are predictable, i.e., constant. Accordingly, if the foregoing is the case there will be eventually a hit on the target. However, if the error is random, say, a human problem, there is no way to find this out during the gunnery exercise and compensate in a rational manner. The foregoing technique is quite time consuming, which translates into a higher cost in man-hours, equipment and expenditures of projectiles.

Consequently, there is a need in the prior art to configure an apparatus that is portable and that can be carried onboard ship and connected to the ship's "machinery" and identify all of the errors in the system.

As further background material, U.S. Pat. No. 3,798,795, filed July 3, 1972, to Michelsen, entitled, "Weapon Aim Evaluation System", discloses a system for qualitatively indicating the accuracy of aim of a weapon including a transponder on the target to measure its range, signal means representing gun fire control parameters, a television camera to follow the target having means to signal the elevation and azimuth of this line of sight and also to register the position of a signal light on the aircraft. All of these signals are received by a data processing unit which calculates the path of a conventional projectile and compares it to the flight of the target. The system exhibits the score of hits or misses and errors in azimuth and elevation. The system does not appear to have the means to produce a display of navigation plots, fall of shot (FOS) plotting nor projectile velocity measurements.

Consequently, there is a need in the prior art to configure an apparatus to accomplish the foregoing while being portable and configured for temporary installation and operation onboard Navy ships.

The prior art, as indicated hereinabove, include advances in weaponry training systems. However, insofar as can be determined no prior art weaponry training system incorporates all of the features and advantages of the present invention.

OBJECTS OF THE INVENTION

Accordingly, a principal object of the present invention is to configure an apparatus that is portable and can be carried onboard ship and connected to the ship's "machinery" so as to identify errors therein.

Another object of the present invention is to configure an apparatus that can be used for both an actual gunnery exercise or a simulation thereof.

Yet another object of the present invention is to configure the apparatus so that it is portable and can diagnose malfunctions in the ship's "machinery" used in the gunnery exercises, but yet be "transparent" to the ship's "machinery".

Still a further object of the present invention is to configure the apparatus so as to operate with ships having both analog data and digital data and/or digital data sources.

Still a further object of the present invention is to configure the apparatus to generate a permanent record of the training errors and training conditions for subsequent review and study.

SUMMARY OF THE INVENTION

In accordance with the above stated objects, and other objects, features and advantages, the apparatus of the present invention has a primary purpose to provide training support and to maintain readiness by allowing a comprehensive empirical assessment and feedback of individual, team and equipment performance during gunnery exercises on an economical and environmentally responsible basis.

The essence of the present invention is in its portability, and its programmability which allows it to be used with different ship classes. It can also be used to train shipboard operators and provide equipment diagnostics and evaluation.

The purpose of the present invention is carried out by configuring the portable shipboard gunnery training/diagnostic apparatus to comprise a target information unit, a range interface unit, a projectile velocity measurement unit, a data collection unit and a simulation/analysis unit. The target information unit generates real time ship position in reference to the position of the desired target. The data collection unit, in accordance with a predetermined program, assimulates data from shipboard digital and/or analog sources, the aforementioned target information unit in coaction with the range interface unit and the projectile velocity measurement unit. The data is formatted and recorded on a recorder portion of the data collection unit and displayed on a display portion thereof. Concurrently, all of the data is transferred in near real time to the simulation/analysis unit which displays in near-real time the pertinent data related to the gunnery exercise being conducted and analysis and related thereto. Simulated gunnery exercises to qualify errors encountered during the actual gunnery exercise is available via the simulation/analysis unit.

BRIEF DESCRIPTIONS OF THE DRAWINGS

The previously stated objects, other objects, features and advantages of the present invention will be apparent from the following more particular description of a preferred embodiment as illustrated in the accompanying drawings, in which:

FIG. 1 is a block diagram representation of a portable shipboard gunery training/diagnostic apparatus according to the present invention; and FIGS. *2a–2d* are illustrations of the four operational phases of the apparatus of FIG. 1 used in explaining the operation thereof.

DESCRIPTION OF THE PREFERRED EMBODIMENT

Figure 1:
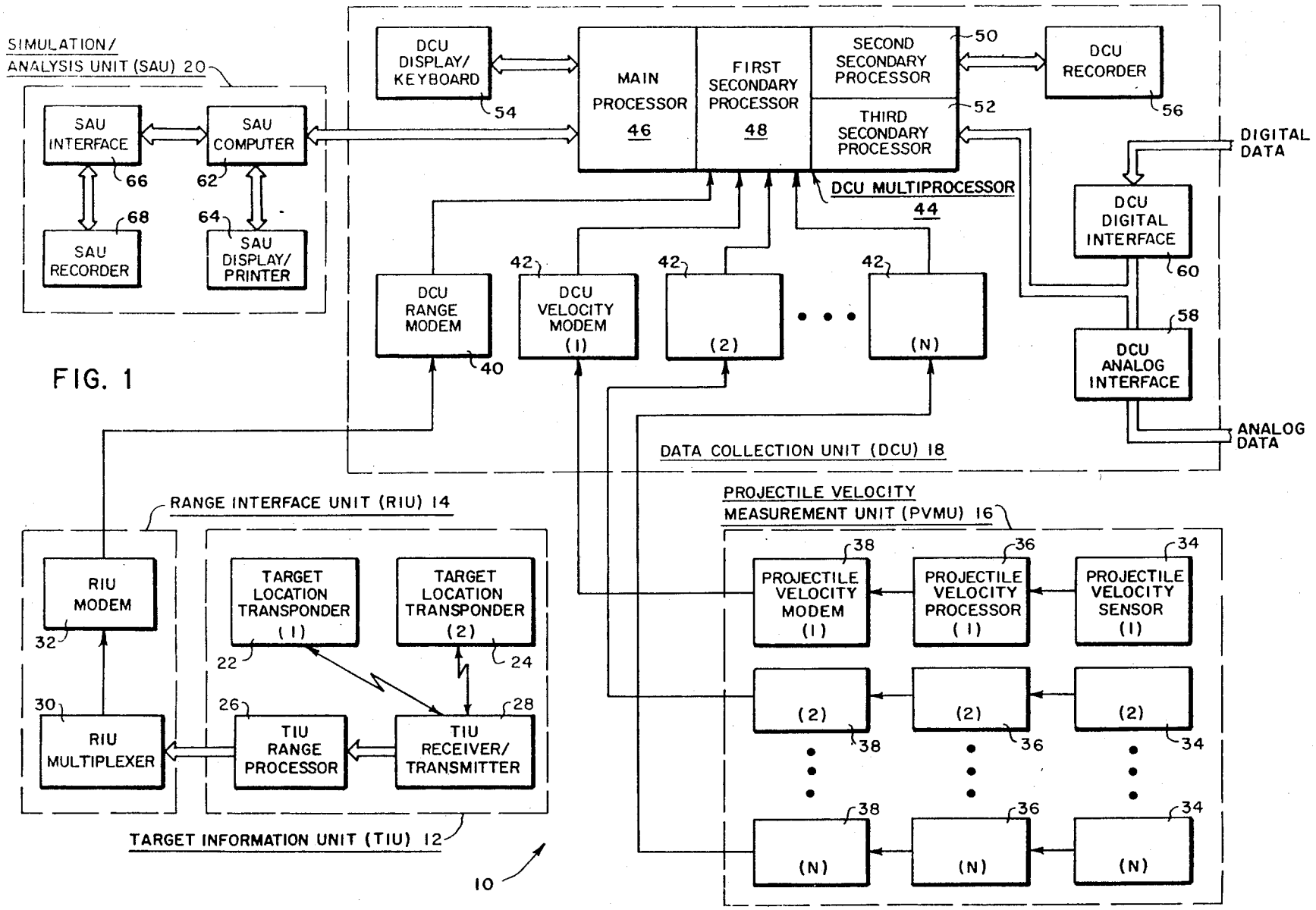

FIG. 1 shows an embodiment of a portable shipboard gunnery/diagnostic apparatus 10 in which the present invention is employed to provide training support and maintain readiness by allowing a comprehensive empirical assessment and feedback of individual, team and equipment performance during an actual or simulated gunnery exercise on an economical and environmental responsible basis. In essence, the apparatus 10 comprises a target information unit 12 (TIU) for measuring the distance from an associated ship to a desired target, a range interface unit (RIU) 14 operatively connected to the target information unit 12 for multiplexing the range information therefrom and conditioning it for subsequent transmission. The apparatus 10 further comprises a projectile velocity measurement unit (PVMU) 16 for measuring the initial velocity of projectiles as they exit the barrels of guns on the associated ship and a data collection unit (DCU) 18. The data collection unit 18 is operatively connected to the aforementioned target information unit 12 via the range interface unit 14. As shown, the data collection unit 18 is also operatively connected to the aforementioned projectile velocity measurement unit 16. Shipboard sources (from the ship's "machinery") of digital and/or analog data are additional connected and used to provide external function signals, e.g., 16 Hz sampling strobe. The apparatus 10 also comprises a simulation/analysis unit 20 which is operatively connected to the data collection unit 18 for simulating analyzing and evaluating according to a predetermined program, the simulated or actual data from the data collection unit 18.

The target information unit 12 comprises first and second target location transponders 22 and 24, respectively, which are physically located so as to bracket the desired target such that triangulation techniques can be used to determine real-time ship-target position information. The target location transponders 22 and 24 are radio transmitter/receivers which transmit identifable signals automatically when properly interrogated by a TIU receiver/transmitter 26. The position information received by the TIU receiver/transmitter 26 is fed to a TIU range processor 28. The TIU range processor 28 determines the actual target distance or range of each of the target location transponders 22 and 24 on an alternate continuous basis in reference to the ship's position.

Still referring to FIG. 1, the range interface unit (RIU) 14 comprises a RIU multiplexer 30 and a RIU modem 32. The range information from the aforementioned TIU range processor 28 drives the RIU multiplexer 30 which converts the range information corresponding to the target location transponders 22 and 24 into a simultaneous transmission thereof. The output of the RIU multiplexer 30 drives the RIU modem 32 which modulates the range information for subsequent transmission.

The projectile velocity measurement unit 16 comprises a plurality of projectile velocity sensors 34, a corresponding plurality of projectile velocity processors 36 and a corresponding plurality of projectile velocity modems 38. For purposes of the present invention, the plurality of projectile velocity sensors 34 can each be a doppler radar mounted on each gun barrel, and the projectile velocity processor 36 corresponding thereto can be a processor of the velocimeter type which is configured to interpret the frequency shift caused by the movement of the projectile. Accordingly, the combination of the foregoing elements allows for the measurement of the initial velocity of the projectile as it exists the gun barrel. The corresponding plurality of projectile velocity modems 38 condition the signal(s) for subsequent transmission. Of course, a modem is a functional unit that modulates and demodulates signals. The function here is to enable digital data to be transmitted over analog transmission facilities.

To continue, and still referring to the block diagram representation of FIG. 1, the data collection unit (DCU) 18 for storing and retrieving data comprises a DCU range modem 40, a plurality of DCU velocity modems 42 and a DCU multiprocessor 44. The DCU multiprocessor 44 comprises a main processor 46 for controlling timing and interpreting commands, a first secondary processor 48, a second secondary processor 50 and a third secondary processor 52. All of the aforementioned processors are configured to communicate without manual intervention. Also, the secondary processors 48, 50 and 52 are dedicated and have predetermined programs for collecting data form the sources shown in FIG. 1. Continuing, the data collection unit 18 further comprises a DCU display/keyboard 54, a DCU recorder 56, a DCU analog interface 58 and a DCU digital interface 60.

As shown in FIG. 1, the output of the RIU modem 32 of the range interface unit 14 is operatively connected to the DCU range modem 40 whose output is connected to the first secondary processor 48. Each of the plurality of the projectile velocity modems 38 are connected to corresponding ones of the plurality of DCU velocity modems 42. The outputs of the DCU velocity modems 42 are connected to the same first secondary processor 48 of the DCU multiprocessor 44. The DCU display/keyboard is configured to communicate with the main processor 46 of the DCU multiprocessor 44 and the DCU recorder 54 is configured to communicate with the second secondary processor 52 of the aforementioned DCU multiprocessor 44. The data collection unit 18 is configured to handle both digital and analog data. This is necessary since the "machinery" of some ships include analog computers while others include digital computers. The data collection unit 18 is configured to handle both types of data and convert it into the proper format for use in the third secondary processor 52 of the DCU multiprocessor 44.

The simulation/analysis unit 20 of the portable shipboard gunnery training/diagnostic apparatus 10 of FIG. 1 comprises a SAU computer 62, a SAU display/printer 64 which is operatively connected to the SAU computer 62 so as to display the processed data therefrom and to print a hard copy of the processed data assembled during a simulated or actual gunnery exercise. The simulation/analysis unit 20 also includes a SAU interface 66 and a SAU recorder 68. The SAU 66 interface formats the data processed by the SAU computer 62 into a suitable form for recording on the SAU recorder 68. The SAU recorder 68 of the simulation/analysis unit 20 and the DCU recorder 56 of the data collection unit 18 are both configured so as to communicate with their corresponding computer or processor, i.e., data can be fetched from and recorded on the aforementioned recorders. As shown, the main processor 46 of the data collection unit 18 communicates with the SAU computer 62 of the simulation/analysis unit 20. Accordingly, the simulation/analysis unit 20 is used to simulate gunnery exercises, reconstruct gunnery firing events and summarize and interpret training exercise results.

STATEMENT OF THE OPERATION

Figures 2A, 2B, 2C, 2D:
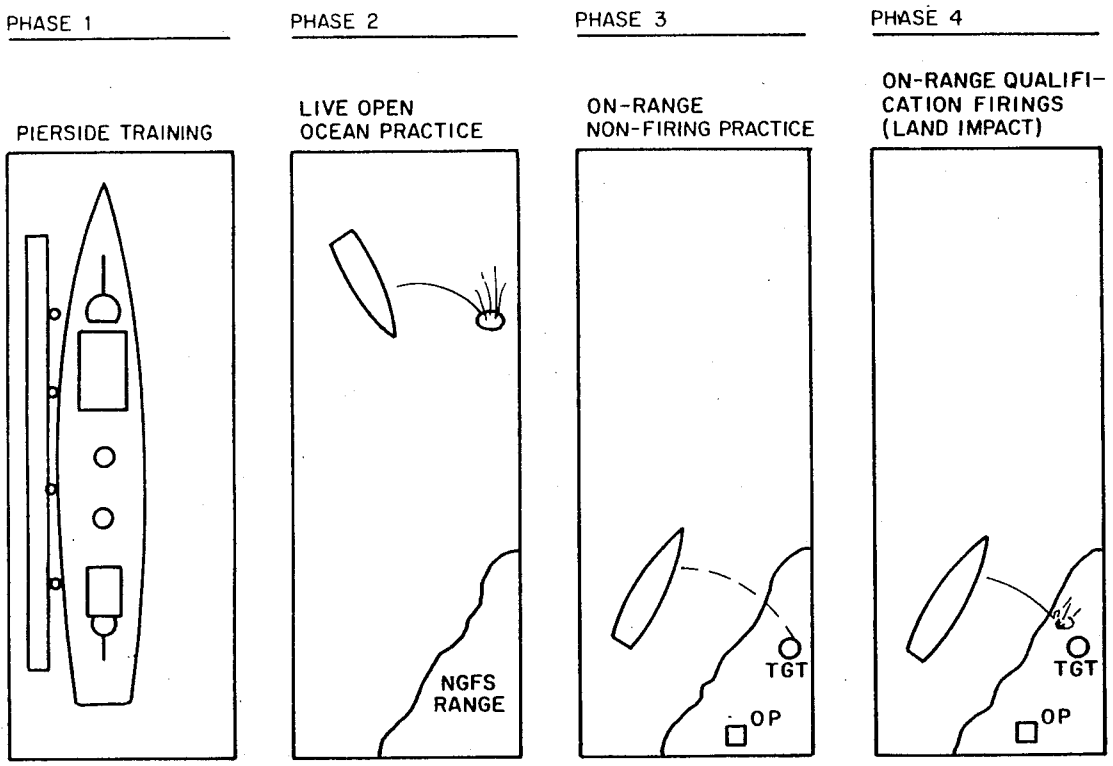

Details of the operation according to a preferred embodiment of the present invention, are explained in conjunction with FIGS. 1 and 2 as viewed concurrently.

Training and readiness deficiencies in need of correction, and pressures to reduce or eliminate firings on land ranges are responsible for a phased approach in configuring the portable shipboard gunnery training/diagnostic apparatus 10. Each successive operational phase, as shown in FIGS. *2a–2d,* is designed to increase confidence that the associated ship will be ready to conduct gunnery exercises with minimal detrimental effect on the environment. The apparatus 10 also allows non-firing practice, which is a major consideration of munitions conservation. Through the modular design of the apparatus 10, operational phases one, two, and three can operate without involving the entire configuration of FIG. 1. The fourth phase, shown in FIG. *2d,* involves the use of all of the elements of the apparatus 10.

Phase 1 consists of dockside training. Trainees operate shipboard "machinery" which interfaces with the apparatus 10 via the data collection unit 18. During this phase, a gunnery problem, including navigation, target, and spotting data can be simulated. From the foregoing inputs, the apparatus 10 will compute an ideal navigational track and use it to generate ranges and/or bearings to known reference points. The trainees are then evaluated on their ability to plot data and correctly compute the associated ship's course and speed and current set and drift.

In Phase 2, the associated ship is at sea for live open ocean practice. The projectile velocity measurement unit 16 is required to measure the initial velocity of the projectiles. Accordingly, the data collection unit 18, the simulation/analysis unit 20 and the aforementioned projectile velocity measurement unit 16 are all used in phase 2.

During this open ocean phase, the apparatus 10 functions somewhat as in Phase 1, the major difference being the availability of more dynamic and empirical data (including the initial velocity of each projectile fired) for use by the apparatus 10. The associated ship's actual course and speed are used to develop a simulated track. This operational phase ensures that the ship's guns function properly and that there are no excessive errors.

In Phase 3, the associated ship is near the target site for on-range non-firing practice. The target information unit 12 and the range interface unit 14 coact to measure the distance from the target by using, inter alia, the target location transponders 22 and 24. Phase 3 uses the target information unit 12, the range interface 14, the data collection unit 18 and the simulation/analysis unit 20.

The major functions of Phase 3 are to evaluate the associated ship's crew on its ability to navigate against a real NGFS range and to predict the impact coordinates of a projectile prior to actual firings. The apparatus 10 also allows monitoring of the associated ship's actual position and its position as formulated by the navigational teams and generated by the ship's "machinery". These two positions are displayed on the simulation/analysis unit display/printer 64 in real time to aid in evaluating the crew's navigation capabilities. Predicting the coordinates of an impact prior to actual firings reduces exercise abortions caused by poor gunnery performance.

During Phase 4, the associated ship is near the target site for on-range qualification firings. All elements of the apparatus 10 are required for this qualifying phase. The apparatus 10 functions as a data collection and monitoring device during Phase 4. As a monitoring device, the apparatus 10 displays (in real time) the actual position of the associated ship relative to the target, as well as the ship's own version of its position and the initial velocity of each projectile fired. Upon completion of the gunnery exercise, the apparatus 10 allows for an analytical reconstruction of the entire gunnery exercise including the isolation and quantification of firing errors. The results of this analysis is used to correct deficiencies prior to deployment.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. A detachable portable shipboard gunnery/diagnostic apparatus for simulation, analysis and assessment of simulated and actual live ordnance firings comprising:

a target information unit for measuring the range information from an associated ship on which said portable shipboard gunnery/diagnostic apparatus is placed to a desired shore target;

a range interface unit operatively connected to said target information unit for multiplexing the range information therefrom and conditioning it for subsequent transmission, a projectile velocity measurement-unit for measuring the initial velocity of projectiles as they exit the barrels of guns on the associated ship;

a data collection unit operatively connected to said range interface unit and said projectile velocity measurement unit for storing and retrieving data therefrom, said collection unit including detachable interfacing means for detachably interfacing information from the "machinery" of the associated ship for deriving gunnery, diagnostic and ballistic parameters, and a simulation/analysis unit operatively connected to said data collection unit and being configured to simulate, summarize and interpret training exercise results, said simulation/analysis unit being operatively connected to said main processor and having a predetermined program for processing the actual gunnery data from said data collection unit and for simulating an actual gunnery exercise.

2. The apparatus of claim 1 wherein said target information unit comprises:

a plurality of target location transponders being located in a predetermined fashion so as to bracket the desired shore target so that triangulation techniques can be used to determine real-time, ship-target position information;

a receiver/transmitter operatively connected to said plurality of target location transponders and being configured to interrogate said plurality of target location transponders so as to receive identifiable signals corresponding to the real-time, ship-target position information; and a range processor operatively connected to said receiver/transmitter for determining the range information of said plurality of target location transponders alternately from the position of the associated ship on a continuous basis.

3. The apparatus of claim 2 wherein said range interface unit comprises:

a multiplexer operatively connected to said range processor for interleaving the range information corresponding to the location of the desired shore target into a simultaneous transmission thereof; and a range information unit modem operatively connected to said multiplexer for modulating the range information for transmission to said data collection unit.

4. The apparatus of claim 3 wherein said projectile velocity measurement unit comprises:

a plurality of projectile sensors each mounted on corresponding gun barrels of the associated ship for generating a signal corresponding to the motion of the projectiles as they exit the gun barrels;

a plurality of projectile velocity processors operatively connected to corresponding ones of said plurality of projectile sensors for converting the signal corresponding to the motion of the projectiles on a continuous basis into the initial velocities thereof; and a plurality of velocity modems operatively connected to corresponding ones of said plurality of projectile velocity processors for modulating the initial velocity information for transmission to said data collection unit.

5. The apparatus of claim 4 wherein said data collection unit comprises:

a data collection unit range modem for demodulating the modulated range information from said range information unit modem;

a plurality of data collection unit velocity modems operatively connected to corresponding ones of said plurality of velocity modems of said projectile velocity measurement unit for demodulating the modulated initial velocity information therefrom; and a data base collection unit multiprocessor operatively connected to said simulation/analysis unit, said data collection unit range modem, said plurality of data collection unit velocity modems, and said means for interfacing information from the "machinery" of the associated ship for the simultaneous storaging and retrieving of the information therefrom.

6. The apparatus of claim 5 wherein said data collection unit further comprises a data collection unit display/keyboard operatively connected to said data collection unit multiprocessor for monitoring and directing the operating modes thereof.

7. The apparatus of claim 6 wherein said data collection unit further comprises a data collection unit recorder operatively connected to said data collection unit multiprocessor for collecting data for post test analysis.

8. The apparatus of claim 7 wherein said data collection multiprocessor comprises:

a first secondary processor operatively connected to said data collection unit range modem and said plurality of data collection unit velocity modems and having a predetermined program for the data collection operation required, which is the collecting of range and velocity data;

a second secondary processor operatively connected to said data collection unit recorder and having a predetermined program for the data operation required, which is the collecting of data for post test analysis;

a third secondary processor operatively connected to said means for interfacing the information from the "machinery" of the associated ship and having a predetermined program for the data operation required, which is the collecting of data from the "machinery" of the associated ship; and a main processor operatively connected to said first, second and third secondary processors, to said simulation/analysis unit and said data collection display/keyboard and having a predetermined program for controlling the timing and interpreting commands therefor.

9. The apparatus of claim 8 wherein said means for interfacing information from the "machinery" of the associated ship comprises:

a data collection unit digital interface operatively connected to said third secondary processor for converting information from the "machinery" of the associated ship, in the form of digital data, into the proper format for use thereby; and a data collection unit analog interface operatively connected to said third secondary processor for converting information from the "machinery" of the associated ship, in the form of analog data, into the proper format for use thereby.

10. The apparatus of claim 9 wherein said simulation/analysis unit comprises:

a simulation/analysis unit display/printer operatively connected to said simulation/analysis unit computer for displaying the processed data therefrom and for printing a hard copy of the simulated or actual gunnery exercise;

a simulation/analysis unit recorder; and a simulation/analysis unit interface operatively connected between said simulation/analysis computer and said simulation/analysis recorder for formatting the data processed by said simulation/analysis unit computer into a form suitable for recording in said simulation/analysis unit recorder.

* * * * *